G. W. BROWN.

SEED-PLANTER.

No. 6,755. Reissued Nov. 23, 1875.

Witnesses:

A. McCallum

J. Knight

Inventor

Geo. W. Brown,

By W. B. Richards,

Atty.

N. PETERS, PHOTO-LITHOGRAPHER, WASHINGTON, D. C.

UNITED STATES PATENT OFFICE.

GEORGE W. BROWN, OF GALESBURG, ILLINOIS.

IMPROVEMENT IN SEED-PLANTERS.

Specification forming part of Letters Patent No. 99,286, dated February 1, 1870; reissue No. 6,755, dated November 23, 1875; application filed January 2, 1875.

DIVISION A.

*To all whom it may concern:*

Be it known that I, GEORGE W. BROWN, of Galesburg, county of Knox and State of Illinois, have invented a new and valuable Improvement in Seed-Planters; and I do hereby declare that the following is a full, clear, and exact description of the construction and operation of the same, reference being had to the annexed drawings making a part of this specification, and to the letters and figures of reference marked thereon.

Figure 1:
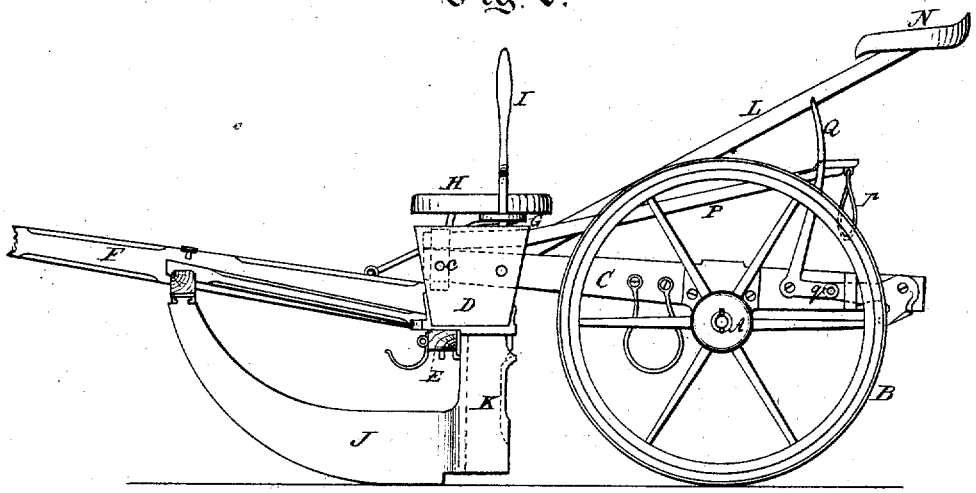
Figure 2:
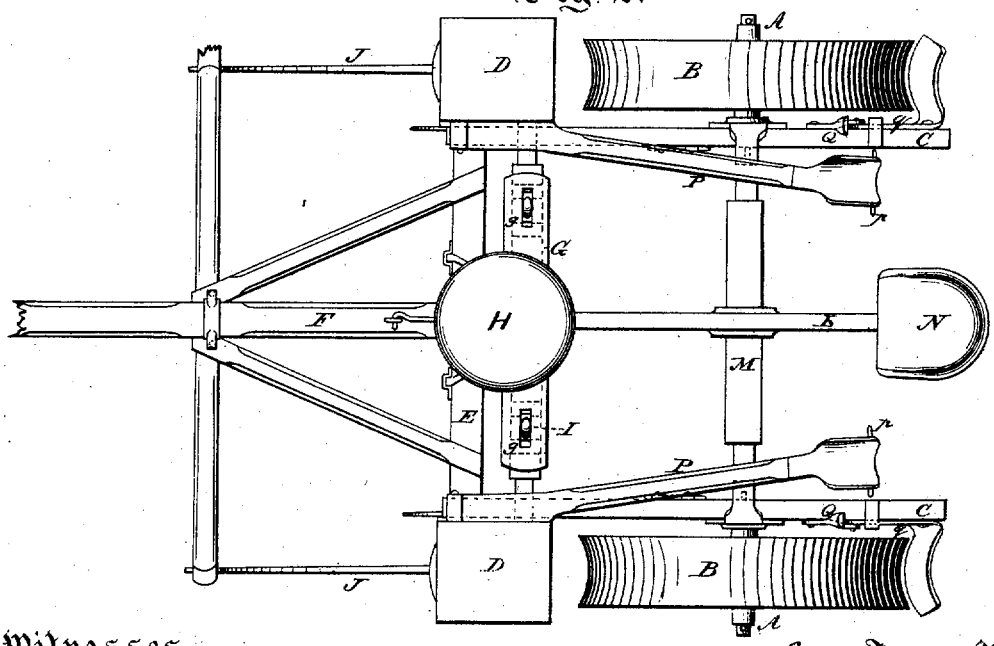

Figure 1 of the drawing is a side elevation of a machine embodying my invention. Fig. 2 is a top view.

The object of my invention is to construct a seed-planter so that the attendant on the rear part of the machine can readily force the fore part of the machine into or out of the ground, or force either or both of the furrow-openers into or out of the ground, as the machine is drawn over it; and, to this end, I employ foot-bars, attached at one end to the runner part of the machine, and their other ends extending back to within reach of the driver's feet, and upon which he may use force for the purpose described.

This invention is designed to be an improvement upon the various inventions in seed-planters which I have made heretofore, and for which I have several patents.

A represents the axle, B B the supporting-wheels, and C C the side frame-pieces, of the rear frame, which is supported on the axle A. D D are the seed-hoppers, loosely attached to the forward ends of the side frame-pieces C C, and connected by a bar, E, to which the tongue F is attached. G is a fulcrum-bar, attached to the seat H, with apertures *g g*, through which the hand-lever I passes. H is a seat, upon which the operator manipulating the hand-lever I sits, and it is located midway between the seed-boxes D D. J J are the runners or furrow-openers, to the widened rear ends of which the seed-tubes K K lead from the hoppers D D.

The foregoing parts are all similar in their relation to each other to the machines described in my former patents, the forward frame carrying the seed-dropping mechanism, being hinged at *c* to the rear frame, as in said patents.

L is a seat-beam, passing from a point under the seat H back over the rest M, and carries on its rear end a driver's seat, N. P P are foot-bars, one on each side of the machine, attached at their forward ends to the seed-boxes or to the forward frame, and extending rearward and somewhat upward to within convenient reach of the driver's feet from his seat N. *p p* are stirrups, attached to the rear ends of the foot-bars P P. Q Q are foot-levers, attached to the rear parts of the side pieces C, and they interlock with wheel-scraper levers *q q*.

The operation is as follows: The team is attached to the tongue and draws the machine forward over the ground. The driver is mounted upon his seat N, and from that position drives the team and governs the machine. With one foot upon the rear end of each of the foot-bars P P, he may, by pressing thereon, throw weight upon either or both runners, or furrow-openers, when desired, to force the runners into hard ground or to cause one of them to conform to any ordinary depression of the surface which may occur in its track. When it is desired to raise the front part of the machine or either runner, the driver may insert his feet in the stirrups *p* for that purpose. And thus, by exerting upward and downward pressure on the rear ends of the foot-bars P, the driver may cause the machine to conform to all ordinary inequalities of the surface of the soil, and thereby deposit the seed at uniform depths in ground with a very uneven surface.

What I claim as new, and desire to secure by Letters Patent, is—

In combination with a seed-planting machine, having a rear main frame and supporting-wheels hinged to a forward frame carrying the seed hoppers and runners, foot-bars P P, secured at their forward ends to the forward frame and projecting in rear for the purpose of raising and lowering said frame by upward and downward pressure from the rear frame by the driver's feet, substantially as and for the purpose specified.

GEORGE W. BROWN.

Witnesses:

M. D. HEBBERD,

J. J. TUNNICLIFF.